United States Patent
Ingram et al.

(10) Patent No.: US 10,875,769 B2
(45) Date of Patent: Dec. 29, 2020

(54) ACID GAS ENRICHMENT METHOD AND SYSTEM

(71) Applicant: BASF SE, Ledwigshafen am Rhein (DE)

(72) Inventors: Thomas Ingram, Ludwigshafen (DE); Gerald Vorberg, Ludwigshafen (DE); Georg Sieder, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 393 days.

(21) Appl. No.: 15/781,555

(22) PCT Filed: Dec. 7, 2016

(86) PCT No.: PCT/EP2016/080121
§ 371 (c)(1),
(2) Date: Jun. 5, 2018

(87) PCT Pub. No.: WO2017/097851
PCT Pub. Date: Jun. 15, 2017

(65) Prior Publication Data
US 2020/0255291 A1 Aug. 13, 2020

(30) Foreign Application Priority Data

Dec. 9, 2015 (EP) .................................... 15198708

(51) Int. Cl.
*B01D 53/14* (2006.01)
*B01D 53/86* (2006.01)
(Continued)

(52) U.S. Cl.
CPC ...... *C01B 17/0408* (2013.01); *B01D 53/1406* (2013.01); *B01D 53/1425* (2013.01);
(Continued)

(58) Field of Classification Search
None
See application file for complete search history.

(56) References Cited

U.S. PATENT DOCUMENTS

| | | | |
|---|---|---|---|
| 4,498,911 A | 2/1985 | Deal et al. | |
| 5,240,476 A * | 8/1993 | Hegarty | ............ B01D 53/1418 95/161 |

(Continued)

FOREIGN PATENT DOCUMENTS

| WO | WO 2005/075056 A1 | 8/2005 |
|---|---|---|
| WO | WO 2010/086334 A1 | 8/2005 |
| WO | WO 2010/130787 A1 | 11/2010 |

OTHER PUBLICATIONS

International Search Report dated Feb. 21, 2017, in PCT/EP2016/080121 dated Dec. 7, 2016.

*Primary Examiner* — Daniel Berns
(74) *Attorney, Agent, or Firm* — Oblon, McClelland, Maier & Neustadt, L.L.P.

(57) ABSTRACT

A process for treating an $H_2S$- and $CO_2$-comprising fluid stream, in which a) the fluid stream is treated in a first absorber at a pressure of 10 to 150 bar with a first substream of a regenerated $H_2S$-selective absorbent to obtain a treated fluid stream and an $H_2S$-laden absorbent; b) the $H_2S$-laden absorbent is heated by indirect heat exchange with regenerated $H_2S$-selective absorbent; c) the heated $H_2S$-laden absorbent is decompressed to a pressure of 1.2 to 10 bar in a low-pressure decompression vessel to obtain a first $CO_2$-rich offgas and a partly regenerated absorbent; d) the partly regenerated absorbent is regenerated in a desorption column to obtain an $H_2S$-rich offgas and regenerated absorbent; e) the $H_2S$-rich offgas is fed to a Claus unit and the offgas from the Claus unit is fed to a hydrogenation unit to obtain hydrogenated Claus tail gas; f) the hydrogenated Claus tail gas and the first $CO_2$-rich offgas are treated in a second absorber at a pressure of 1 to 4 bar with a second substream of the regenerated $H_2S$-selective absorbent to obtain a second $CO_2$-rich offgas and a second $H_2S$-laden absorbent; and g) the second $H_2S$-laden absorbent is guided into the (Continued)

first absorber. Also described is a plant suitable for performance of the process. The process is notable for a low energy requirement.

14 Claims, 4 Drawing Sheets

(51) Int. Cl.
*C01B 17/04* (2006.01)
*C10L 3/10* (2006.01)

(52) U.S. Cl.
CPC ..... *B01D 53/1462* (2013.01); *B01D 53/1493* (2013.01); *C10L 3/103* (2013.01); *C10L 3/104* (2013.01); *B01D 2252/20431* (2013.01); *B01D 2252/20484* (2013.01); *B01D 2252/60* (2013.01); *B01D 2256/245* (2013.01); *B01D 2257/304* (2013.01); *B01D 2257/504* (2013.01); *C10L 2290/542* (2013.01)

(56) References Cited

U.S. PATENT DOCUMENTS

| | | |
|---|---|---|
| 5,820,837 A | 10/1998 | Marjanovich et al. |
| 2006/0150812 A1 | 7/2006 | Mak et al. |
| 2008/0019899 A1 | 1/2008 | Mak et al. |
| 2008/0107581 A1 | 5/2008 | Sparling et al. |
| 2010/0186590 A1 | 7/2010 | Vorberg et al. |
| 2010/0288125 A1 | 11/2010 | Vorberg et al. |

* cited by examiner

ACID GAS ENRICHMENT METHOD AND SYSTEM

The present invention relates to a process and a plant for treating an $H_2S$- and $CO_2$-comprising fluid stream with acid gas enrichment and sulfur recovery in a Claus plant.

The removal of acid gases, for example $CO_2$, $H_2S$, $SO_2$, $CS_2$, HCN, COS or mercaptans, from fluid streams such as natural gas, refinery gas or synthesis gas is important for various reasons. The content of sulfur compounds in natural gas has to be reduced directly at the natural gas source through suitable treatment measures, since the sulfur compounds form acids having corrosive action in the water frequently entrained by the natural gas. For the transport of the natural gas in a pipeline or further processing in a natural gas liquefaction plant (LNG=liquefied natural gas), given limits for the sulfur-containing impurities therefore have to be observed. In addition, numerous sulfur compounds are malodorous and toxic even at low concentrations.

Carbon dioxide has to be removed from natural gas among other substances, because a high concentration of $CO_2$ reduces the calorific value of the gas. Moreover, $CO_2$ in conjunction with moisture, which is frequently entrained in the fluid streams, can lead to corrosion in pipes and valves. If natural gas is liquefied for transport to give LNG (LNG=liquid natural gas), the $CO_2$ has to be substantially removed beforehand. At the temperature of the liquid natural gas (about $-162°$ C.), the $CO_2$ would resublime and damage parts of the plant. On the other hand, too low a concentration of $CO_2$ may likewise be undesirable, for example in the case of feeding into the natural gas grid, since this can result in too high a calorific value of the gas.

Acid gases are removed by using scrubbing operations with aqueous solutions of inorganic or organic bases. When acid gases are dissolved in the absorbent, ions form with the bases. The absorbent can be regenerated by decompression to a lower pressure and/or by stripping, in which case the ionic species react in reverse to form acid gases and/or are stripped out by means of steam. After the regeneration process, the absorbent can be reused.

A process in which all acid gases, especially $CO_2$ and $H_2S$, are very substantially removed is referred to as "total absorption". In particular cases, in contrast, it may be desirable to preferentially absorb $H_2S$ over $CO_2$, for example in order to obtain a calorific value-optimized $H_2S/CO_2$ ratio for a downstream Claus plant. In this case, reference is made to "selective scrubbing". An unfavorable $H_2S/CO_2$ ratio can impair the performance and efficiency of the Claus plant through an excessively low calorific value. The Claus process typically requires a minimum $H_2S$ content of 30% by volume. In order to operate the Claus plant at low $H_2S/CO_2$ ratios, it is necessary to use more complex process variants. For example, it is possible to choose a split flow configuration, to increase the oxygen content in the fluid stream, or to recycle sulfur into the burner of the Claus plant.

By choosing and using a selective absorbent, it is possible to achieve quite a good selectivity for the removal of hydrogen sulfide over carbon dioxide. However, this selectivity is insufficient when an unfavorable ratio of hydrogen sulfide to carbon dioxide in the feed gas leads to an acid gas having such a low content of sulfur components that the acid gas can no longer be processed in a Claus plant.

In order to process such a "diluted" acid gas in a Claus plant, additional measures are therefore necessary. In general, the sulfur components are concentrated by once again removing the sulfur components present in the acid gas of low concentration with regenerated absorption solution by means of a second absorption column, in which case a correspondingly higher concentration of sulfur components in the acid gas of the second absorption stage is achieved because of the already better ratios of hydrogen sulfide with respect to carbon dioxide in the acid gas from the first absorption stage.

WO 2005/075056 A1 describes a process for removing acid gases from a hydrocarbonaceous fluid stream using an $H_2S$-selective absorbent. A first laden absorbent is regenerated in a desorption column. A substream of the gas stream discharged from the desorption column is treated with fresh absorbent and the second $H_2S$-laden absorbent stream is combined with the first $H_2S$-laden absorbent stream. The $H_2S$ content of the gas stream discharged from the desorption column is thus increased, and a substream can be fed to the Claus plant.

U.S. Pat. No. 5,820,837 describes a process for removing acid gases from a hydrocarbonaceous fluid stream using an $H_2S$-selective absorbent. The laden absorbent is partly regenerated in a high-pressure decompression vessel and then a low-pressure decompression vessel, before it is fed into a desorption column. The $CO_2$-enriched gas obtained from the low-pressure decompression vessel is treated again with fresh absorbent in an absorber, which increases the $H_2S$ content of the gas stream discharged from the desorption column and allows it to be fed to a Claus plant.

However, these procedures are energy-intensive and have high capital costs.

It is an object of the invention to specify a process cited at the outset having an optimized energy demand, and a plant suitable for performing the process.

The object is achieved by a process for treating an $H_2S$- and $CO_2$-comprising fluid stream, in which
  a) the fluid stream is treated in a first absorber at a pressure of 10 to 150 bar with a first substream of a regenerated $H_2S$-selective absorbent to obtain a treated fluid stream and an $H_2S$-laden absorbent;
  b) the $H_2S$-laden absorbent is heated by indirect heat exchange with regenerated $H_2S$-selective absorbent;
  c) the heated $H_2S$-laden absorbent is decompressed to a pressure of 1.2 to 10 bar in a low-pressure decompression vessel to obtain a first $CO_2$-rich offgas and a partly regenerated absorbent;
  d) the partly regenerated absorbent is regenerated in a desorption column to obtain an $H_2S$-rich offgas and regenerated absorbent;
  e) the $H_2S$-rich offgas is fed to a Claus unit and the offgas from the Claus unit is fed to a hydrogenation unit to obtain hydrogenated Claus tail gas;
  f) the hydrogenated Claus tail gas and the first $CO_2$-rich offgas are treated in a second absorber at a pressure of 1 to 4 bar with a second substream of the regenerated $H_2S$-selective absorbent to obtain a second $CO_2$-rich offgas and a second $H_2S$-laden absorbent; and
  g) the second $H_2S$-laden absorbent is guided into the first absorber.

The invention also relates to a plant for treating an $H_2S$- and $CO_2$-comprising fluid stream, comprising
  a) a first absorber connected via a first heat exchanger in a fluid-conducting manner to a desorption column, in order to accept a first substream of are generated $H_2S$-selective absorbent from the desorption column, the first absorber being designed to promote the absorption of $H_2S$ and $CO_2$ from the fluid stream into the first substream of the regenerated H$_2$S-selective absorbent to obtain a treated fluid stream and an H$_2$S-laden absorbent;

and the first heat exchanger being designed to heat the H$_2$S-laden absorbent by indirect heat exchange with regenerated H$_2$S-selective absorbent from the desorption column:

b) a low-pressure decompression vessel which is connected in a fluid-conducting manner to the first heat exchanger and is designed to decompress the heated H$_2$S-laden absorbent to obtain a first CO$_2$-rich offgas and a partly regenerated absorbent;

c) a line which guides the partly regenerated absorbent into the desorption column to obtain an H$_2$S-rich offgas and regenerated absorbent;

d) a Claus unit which accepts the H$_2$S-rich offgas, and a hydrogenation unit which accepts the offgas from the Claus unit to obtain hydrogenated Claus tail gas;

e) a second absorber which is connected in a fluid-conducting manner to the desorption column and is designed to promote the absorption of H$_2$S from the hydrogenated Claus tail gas and the first CO$_2$-rich offgas into a second substream of the regenerated H$_2$S-selective absorbent to obtain a second CO$_2$-rich offgas and a second H$_2$S-laden absorbent;

f) a line which guides the second H$_2$S-laden absorbent into the first absorber.

Unless stated otherwise, the elucidations and preferences which follow apply equally to the process of the invention and the plant of the invention.

In step a), an H$_2$S-selective absorbent is used, in order to absorb H$_2$S from the fluid stream and co-absorb CO$_2$. CO$_2$ is flashed off from the H$_2$S-laden absorbent in step c) as the first CO$_2$-rich offgas, after the H$_2$S-laden absorbent has been exchange-heated with regenerated absorbent. In this way, the relative H$_2$S concentration of the H$_2$S-laden absorbent is increased and the H$_2$S-rich offgas obtained in step d) has a composition which can be fed directly to a Claus plant.

The Claus tail gas and the first CO$_2$-ich offgas have residual H$_2$S concentrations which cannot be released directly into the environment. In the process of the invention, the hydrogenated Claus tail gas and the first CO$_2$-rich offgas are treated together with fresh absorbent in a second absorber. Since the absorption capacity of the absorbent is not exhausted after it has been used in the second absorber, the second H$_2$S-laden absorbent is guided into the first absorber, in order to exhaust the absorption capacity. It has been found that the process, with the same separation task, requires a lower regeneration energy and a lower overall circulation rate of the absorbent than processes having separate treatment of the hydrogenated Claus tail gas.

While the acid gas removal in the first absorber is effected at high pressure, the acid gas enrichment in the second absorber takes place at a lower pressure. Since the H$_2$S selectivity of an absorbent is generally greater at low pressure (and equal temperature), a high removal of both H$_2$S and CO$_2$ from the fluid stream to be treated in the first absorber and a highly selective removal of H$_2$S from the gas treated in the second absorber is enabled.

Preferably, the cumulated CO$_2$ and H$_2$S loading of the laden absorbent after the treatment of the fluid stream in the first absorber is at least 0.20 mol/mol, more preferably at least 0.25 mol/mol, expressed as the sum total of the molar amounts of CO$_2$ and H$_2$S dissolved in the absorbent divided by the molar amount of the components of the absorbent which react with CO$_2$ and H$_2$S (for example aminic components).

According to the invention, an H$_2$S-selective absorbent is used. H$_2$S-selective absorbents utilized may be either chemical absorbents, for example selective amines, or physical absorbents, for example Selexol, Pursiol, Genosorb or Morphysorb. Chemical absorbents are preferred.

Chemical H$_2$S-selective absorbents used are typically solutions, especially aqueous solutions, of at least one amine selected from tertiary amines and sterically hindered amines. Tertiary amines and sterically hindered amines exhibit kinetic selectivity for H$_2$S over CO$_2$. These amines do not react directly with CO$_2$; instead, CO$_2$ is reacted in a slow reaction with the amine and with water to give ionic products—in contrast, H$_2$S reacts immediately in aqueous amine solutions.

In one embodiment, the aqueous solution comprises at least one water-miscible organic solvent. It may be desirable here to limit the water content of the absorbent, for example to a maximum of 40% by weight or a maximum of 30% by weight or a maximum of 20% by weight or a maximum of 10% by weight or a maximum of 5% by weight, based on the weight of the absorbent.

The organic solvent is preferably selected from:
$C_4$-$C_{10}$ alcohols such as n-butanol, n-pentanol and n-hexanol;
ketones such as cyclohexanone;
esters such as ethyl acetate and butyl acetate;
lactones such as γ-butyrolactone, δ-valerolactone and ε-caprolactone;
amides such as tertiary carboxamides, for example N,N-dimethylformamide; or N-formylmorpholine and N-acetylmorpholine;
lactams such as γ-butyrolactam, δ-valerolactam and ε-caprolactam and N-methyl-2-pyrrolidone (NMP);
sulfones such as sulfolane;
sulfoxides such as dimethyl sulfoxide (DMSO);
diols, for example glycols such as ethylene glycol (EG) and propylene glycol;
polyalkylene glycols such as diethylene glycol (DEG) and triethylene glycol (TEG);
di- or mono($C_{1-4}$-alkyl ether) glycols such as ethylene glycol dimethyl ether;
di- or mono($C_{1-4}$-alkyl ether) polyalkylene glycols such as diethylene glycol dimethyl ether, dipropylene glycol monomethyl ether and triethylene glycol dimethyl ether;
cyclic ureas such as N,N-dimethylimidazolidin-2-one and dimethylpropyleneurea (DMPU);
thioalkanols such as ethylenedithioethanol, thiodiethylene glycol (thiodiglycol, TDG) and methylthioethanol;
and mixtures thereof.

More preferably, the organic solvent is selected from sulfones, diols, di- or mono($C_{1-4}$-alkyl ether) polyalkylene glycols and polyalkylene glycols. Most preferably, the organic solvent is selected from sulfones. A preferred organic solvent is sulfolane.

A "tertiary amine" is understood to mean compounds having at least one tertiary amino group. A tertiary amine is understood to mean a compound having a nitrogen atom substituted by three organic radicals other than hydrogen. The tertiary amine preferably comprises exclusively tertiary amino groups, meaning that it does not comprise any primary or secondary amino groups alongside at least one tertiary amino group. The tertiary amine preferably does not have any acidic groups such as, in particular, phosphonic acid, sulfonic acid and/or carboxylic acid groups.

The suitable tertiary amines especially include:
1. Tertiary alkanolamines such as bis(2-hydroxyethyl)methylamine (methyldiethanolamine, MDEA), tris(2-hydroxyethyl)amine (triethanolamine, TEA), tributanolamine, 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine (methyldiisopropanolamine, MDIPA);
2. Tertiary amino ethers such as 3-methoxypropyldimethylamine;
3. Tertiary polyamines, for example bis-tertiary diamines such as N,N,N',N'-tetramethylethylenediamine, N,N-diethyl-N',N'-dimethylethylenediamine, N,N,N',N'-tetraethylethylenediamine, N,N,N',N'-tetramethyl-1,3-propanediamine (TMPDA), N,N,N',N'-tetraethyl-1,3-propanediamine (TEPDA), N,N,N',N'-tetramethyl-1,6-hexanediamine, N,N-dimethyl-N',N'-diethylethylenediamine (DMDEEDA), 1-dimethylamino-2-dimethylaminoethoxyethane (bis[2-(dimethylamino)ethyl] ether), 1,4-diazabicyclo[2.2.2]octane (TEDA), tetramethyl-1,6-hexanediamine;
and mixtures thereof.

Tertiary alkanolamines, i.e. amines having at least one hydroxyalkyl group bonded to the nitrogen atom, are generally preferred. Particular preference is given to methyldiethanolamine (MDEA).

Suitable sterically hindered amines comprise sterically hindered secondary amines and sterically hindered primary amines. Preference is given to sterically hindered secondary amines.

Steric hindrance in the case of secondary amino groups is understood to mean the presence of at least one secondary or tertiary carbon atom directly adjacent to the nitrogen atom of the amino group. Steric hindrance in the case of primary amino groups is understood to mean the presence of at least one tertiary carbon atom directly adjacent to the nitrogen atom of the amino group. Suitable sterically hindered amines also comprise compounds which are referred to in the prior art as highly sterically hindered amines and have a steric parameter (Taft constant) $E_s$ of more than 1.75.

A secondary carbon atom is understood to mean a carbon atom which, apart from the bond to the sterically hindered position, has two carbon-carbon bonds. A tertiary carbon atom is understood to mean a carbon atom which, apart from the bond to the sterically hindered position, has three carbon-carbon bonds. A secondary amine is understood to mean a compound having a nitrogen atom substituted by two organic radicals other than hydrogen. A primary amine is understood to mean a compound having a nitrogen atom substituted by one organic radical other than hydrogen.

Preferably, the sterically hindered amine comprises an isopropylamino group, a tert-butylamino group or a 2,2,6,6-tetramethylpiperidinyl group.

Suitable sterically hindered primary amines include 2-amino-2-methylpropanol (2-AMP), 2-amino-2-ethylpropanol, 2-amino-2-propylpropanol and 2-(2-amino-2-methylpropoxy)ethanol.

Suitable sterically hindered secondary amines include 2-(tert-butylamino)ethanol, 2-(isopropylamino)-1-ethanol, 2-(isopropylamino)-1-propanol, 2-(2-tert-butylaminoethoxy)ethanol (TBAEE), 2-(2-isopropylaminoethoxy)ethanol (IPAEE), 2-(2-(2-tert-butylaminoethoxy)ethoxy)ethanol, 2-(2-(2-isopropylaminoethoxy)ethoxy)ethanol, 2-methyl-amino-2-methylpropanol, 4-hydroxy-2,2,6,6-tetramethylpiperidine, 4-(3'-hydroxypropoxy)-2,2,6,6-tetramethylpiperidine, 4-(4'-hydroxybutoxy)-2,2,6,6-tetramethylpiperidine, 2-(2-(2-tert-butylaminoethoxy)ethoxy)ethyl methyl ether (M3ETB), bis(2-(tert-butylamino)ethyl) ether, bis(2-(isopropylamino)ethyl) ether, 2-(2-(2-tert-butylaminoethoxy)ethoxy)ethyl-tert-butylamine, 2-(2-(2-isopropylaminoethoxy)ethoxy)-ethylisopropylamine, 2-(2-(2-(2-tert-butylaminoethoxy)ethoxy)ethoxy)ethyl-tert-butylamine, 2-(2-(2-(2-isopropylaminoethoxy)ethoxy)ethoxy)ethylisopropylamine, 4-(di(2-hydroxyethyl)amino)-2,2,6,6-tetramethylpiperidine and mixtures thereof.

Even more preferably, the sterically hindered secondary amine is selected from 2-(2-isopropylaminoethoxy)ethanol (IPAEE), 2-(2-tert-butylaminoethoxy)ethanol (TBAEE), 2-(2-(2-tert-butylaminoethoxy)ethoxy)ethyl-tert-butylamine, 2-(2-(2-isopropylaminoethoxy)ethoxy)ethylisopropylamine, 2-(2-(2-(2-tert-butylaminoethoxy)ethoxy)ethoxy)ethyl-tert-butylamine, 2-(2-(2-(2-isopropylaminoethoxy)ethoxy)ethoxy)ethylisopropylamine and 2-(2-(2-tert-butylaminoethoxy)ethoxy)ethyl methyl ether (M3ETB). Most preferably, the sterically hindered secondary amine is 2-(2-tert-butylaminoethoxy)ethanol (TBAEE).

In one embodiment, the absorbent comprises an aqueous solution of a sterically hindered amine, preferably a sterically hindered secondary amine, and a tertiary amine. Preferably, the absorbent comprises an aqueous solution of TBAEE and MDEA. Through the variation in the molar ratio of sterically hindered amine to tertiary amine, it is possible to influence the exothermicity of the reaction of the absorbent with acid gases and the $H_2S$ selectivity of the absorbent.

Sterically hindered amines, for example TBAEE, in many cases have a marked dependence of the $H_2S$ selectivity on the pressure. Thus, it is possible by additional use of a sterically hindered amine such as TBAEE in an absorbent to achieve a high level of $CO_2$ removal with a simultaneously high level of $H_2S$ removal in the first absorber and a high $H_2S$ selectivity in the second absorber. The use of sterically hindered amines such as TBAEE, at low partial pressures of $CO_2$ and $H_2S$, also allows higher removal of $H_2S$.

In general, the total concentration of the sterically hindered amine and the tertiary amine in the absorbent is 10% to 60% by weight, preferably 20% to 50% by weight, more preferably 30% to 50% by weight.

The molar ratio of the sterically hindered amine to the tertiary amine is preferably greater than 0.05 and is, for example, in the range from 0.1 to 0.9. By varying the molar ratio of the sterically hindered amine to the tertiary amine, it is possible to adjust the $H_2S$ selectivity to the particular requirements.

Preferably, the absorbent does not comprise any sterically unhindered primary or secondary amines. Compounds of this kind act as strong promoters of $CO_2$ absorption. As a result, the $H_2S$ selectivity of the absorbent can be lost. A sterically unhindered primary or secondary amine is understood to mean compounds having primary or secondary amino groups to which only hydrogen atoms or primary carbon atoms are bonded.

In one embodiment, the aqueous absorbent comprises an acid. The acid preferably has a $pK_A$ of less than 6, especially less than 5. In the case of acids having more than one dissociation stage and accordingly more than one $pK_A$, this requirement is met when one of the $pK_A$ values is within the range specified. The acid is suitably selected from protic acids (Brønsted acids).

The amount of acid, in one embodiment, is 0.1% to 5.0% by weight, preferably 0.2% to 4.0% by weight, more preferably 0.3% to 3.0% by weight and most preferably 0.4% to 2.0% by weight, based on the weight of the absorbent.

The acid is selected from organic and inorganic acids. Suitable organic acids comprise, for example, phosphonic acids, sulfonic acids, carboxylic acids and amino acids. In particular embodiments, the acid is a polybasic acid.

Suitable acids are, for example,
mineral acids such as hydrochloric acid, sulfuric acid, amidosulfuric acid, phosphoric acid, partial esters of phosphoric acid, for example mono- and dialkyl phosphates and mono- and diaryl phosphates such as tridecyl phosphate, dibutyl phosphate, diphenyl phosphate and bis(2-ethylhexyl) phosphate; boric acid;
carboxylic acids, for example saturated aliphatic monocarboxylic acids such as formic acid, acetic acid, propionic acid, butyric acid, isobutyric acid, valeric acid, isovaleric acid, pivalic acid, caproic acid, n-heptanoic acid, caprylic acid, 2-ethylhexanoic acid, pelargonic acid, caproic acid, neodecanoic acid, undecanoic acid, lauric acid, tridecanoic acid, myristic acid, pentadecanoic acid, palmitic acid, margaric acid, stearic acid, isostearic acid, arachic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positionally isomeric toluic acids, methoxybenzoic acids, chlorobenzoic acids, nitrobenzoic acids, phthalic acid, terephthalic acid, isophthalic acid; technical carboxylic acid mixtures, for example Versatic acids;
sulfonic acids such as methylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalenesulfonic acid and dinonylnaphthalenedisulfonic acid, trifluoromethyl- or nonafluoro-n-butylsulfonic acid, camphorsulfonic acid, 2-(4-(2-hydroxyethyl)-1-piperazinyl)ethanesulfonic acid (HEPES);
organic phosphonic acids, for example phosphonic acids of the formula (I)

in which $R^1$ is $C_{1-18}$-alkyl optionally substituted by up to four substituents independently selected from carboxyl, carboxamido, hydroxyl and amino.

These include alkylphosphonic acids such as methylphosphonic acid, propylphosphonic acid, 2-methylpropylphosphonic acid, t-butylphosphonic acid, n-butylphosphonic acid, 2,3-dimethylbutylphosphonic acid, octylphosphonic acid; hydroxyalkylphosphonic acids such as hydroxymethylphosphonic acid, 1-hydroxyethylphosphonic acid, 2-hydroxyethylphosphonic acid; arylphosphonic acids such as phenylphosphonic acid, tolylphosphonic acid, xylylphosphonic acid, aminoalkylphosphonic acids such as aminomethylphosphonic acid, 1-aminoethylphosphonic acid, 1-dimethylaminoethylphosphonic acid, 2-aminoethylphosphonic acid, 2-(N-methylamino)ethylphosphonic acid, 3-aminopropylphosphonic acid, 2-aminopropylphosphonic acid, 1-aminopropylphosphonic acid, 1-aminopropyl-2-chloropropylphosphonic acid, 2-aminobutylphosphonic acid, 3-aminobutylphosphonic acid, 1-aminobutylphosphonic acid, 4-aminobutylphosphonic acid, 2-aminopentylphosphonic acid, 5-aminopentylphosphonic acid, 2-aminohexylphosphonic acid, 5-aminohexylphosphonic acid, 2-aminooctylphosphonic acid, 1-aminooctylphosphonic acid, 1-aminobutylphosphonic acid; amidoalkylphosphonic acids such as 3-hydroxymethylamino-3-oxopropylphosphonic acid; and phosphonocarboxylic acids such as 2-hydroxyphosphonoacetic acid and 2-phosphonobutane-1,2,4-tricarboxylic acid;
phosphonic acids of the formula (II)

in which $R^2$ is H or $C_{1-6}$-alkyl, Q is H, OH or $NY_2$ and Y is H or $CH_2PO_3H_2$, such as 1-hydroxyethane-1,1-diphosphonic acid;
phosphonic acids of the formula (III)

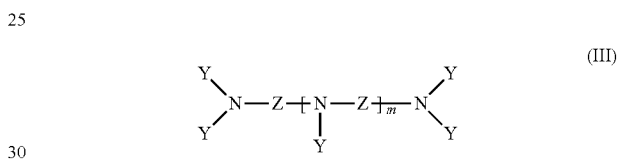

in which Z is $C_{2-6}$-alkylene, cycloalkanediyl, phenylene, or $C_{2-6}$-alkylene interrupted by cycloalkanediyl or phenylene, Y is $CH_2PO_3H_2$ and m is 0 to 4, such as ethylenediaminetetra(methylenephosphonic acid), diethylenetriaminepenta(methylenephosphonic acid) and bis(hexamethylene)triaminepenta(methylenephosphonic acid);
phosphonic acids of the formula (IV)

in which $R^3$ is $C_{1-6}$-alkyl, $C_{2-6}$-hydroxyalkyl or Y, and Y is $CH_2PO_3H_2$, such as nitrilotris(methylenephosphonic acid) and 2-hydroxyethyliminobis(methylenephosphonic acid);
aminocarboxylic acids having tertiary amino groups or amino groups having at least one secondary or tertiary carbon atom immediately adjacent to the amino group, such as
α-amino acids having tertiary amino groups or amino groups having at least one secondary or tertiary carbon atom immediately adjacent to the amino group, such as N,N-dimethylglycine (dimethylaminoacetic acid), N,N-diethylglycine, alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (1-amino-2-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, N-methylserine, N,N-dimethylserine, 2-(methylamino)isobutyric acid, piperidine-2-carboxylic acid, N-methylpiperidine-2-carboxylic acid,
β-amino acids having tertiary amino groups or amino groups having at least one secondary or tertiary carbon atom immediately adjacent to the amino group, such as 3-dimethylaminopropionic acid, N-methyliminodipropionic acid, N-methylpiperidine-3-carboxylic acid,
γ-amino acids having tertiary amino groups or amino groups having at least one secondary or tertiary carbon atom immediately adjacent to the amino group, such as 4-dimethylaminobutyric acid,
or aminocarboxylic acids having tertiary amino groups or amino groups having at least one secondary or tertiary carbon atom immediately adjacent to the amino group, such as N-methylpiperidine-4-carboxylic acid.

Among the inorganic acids, preference is given to phosphoric acid and sulfuric acid, especially phosphoric acid.

Among the carboxylic acids, preference is given to formic acid, acetic acid, benzoic acid, succinic acid and adipic acid.

Among the sulfonic acids, preference is given to methanesulfonic acid, p-toluenesulfonic acid and 2-(4-(2-hydroxyethyl)-1-piperazinyl)ethanesulfonic acid (HEPES).

Among the phosphonic acids, preference is given to 2-hydroxyphosphonoacetic acid, 2-phosphonobutane-1,2,4-tricarboxylic acid, 1-hydroxyethane-1,1-diphosphonic acid, ethylenediaminetetra(methylenephosphonic acid), diethylenetriaminepenta(methylenephosphonic acid), bis(hexamethylene)triaminepenta(methylenephosphonic acid) (HDTMP) and nitrilotris(methylenephosphonic acid), among which 1-hydroxyethane-1,1-diphosphonic acid is particularly preferred.

Among the aminocarboxylic acids having tertiary amino groups or amino groups having at least one secondary or tertiary carbon atom immediately adjacent to the amino group, preference is given to N,N-dimethylglycine and N-methylalanine.

More preferably, the acid is an inorganic acid.

The absorbent may also comprise additives such as corrosion inhibitors, enzymes, etc. In general, the amount of such additives is in the range from about 0.01% to 3% by weight of the absorbent.

The process of the invention is suitable for treatment of all kinds of fluids. Fluids are firstly gases such as natural gas, synthesis gas, coke oven gas, coal gasification gas, cycle gas and landfill gases, and secondly fluids that are essentially immiscible with the absorbent, such as LPG (liquefied petroleum gas) or NGL (natural gas liquids). The process of the invention is particularly suitable for treatment of hydrocarbonaceous fluid streams. The hydrocarbons present are, for example, aliphatic hydrocarbons such as $C_1$-$C_4$ hydrocarbons such as methane, unsaturated hydrocarbons such as ethylene or propylene, or aromatic hydrocarbons such as benzene, toluene or xylene.

In preferred embodiments, the fluid stream is a fluid stream comprising hydrocarbons, especially a natural gas stream. More preferably, the fluid stream comprises more than 1.0% by volume of hydrocarbons, even more preferably more than 5.0% by volume of hydrocarbons, most preferably more than 15% by volume of hydrocarbons.

The partial hydrogen sulfide pressure in the fluid stream is typically at least 2.5 mbar. In preferred embodiments, a partial hydrogen sulfide pressure of at least 0.1 bar, especially at least 1 bar, and a partial carbon dioxide pressure of at least 0.2 bar, especially at least 1 bar, is present in the fluid stream. The partial pressures stated are based on the fluid stream on first contact with the absorbent in the absorption step.

In the process of the invention, the fluid stream to be treated is contacted in a first absorber with the $H_2S$-selective absorbent, as a result of which $H_2S$ is absorbed and $CO_2$ is co-absorbed. A treated fluid stream and an $H_2S$-laden absorbent are obtained. The pressure in the first absorber is 10 to 150 bar, preferably 30 to 120 bar, usually 50 to 90 bar. The total pressure of the fluid stream corresponds essentially to the pressure in the first absorber.

The treatment of the $H_2S$- and $CO_2$-comprising fluid stream in the first absorber is not usually a total absorption, meaning that the treated fluid stream comprises a reduced concentration of $CO_2$ compared to the concentration in the fluid stream to be treated. The treated fluid stream typically still comprises at least 1.0% by volume of $CO_2$, preferably at least 1.5% by volume of $CO_2$, more preferably at least 2.0% by volume of $CO_2$.

The first absorber used is a scrubbing apparatus used in customary gas scrubbing processes. Suitable scrubbing apparatuses are, for example, random packings, columns having structured packings and having trays, membrane contactors, radial flow scrubbers, jet scrubbers, Venturi scrubbers and rotary spray scrubbers, preferably columns having structured packings, having random packings and having trays, more preferably columns having trays and having random packings. The fluid stream is preferably treated with the absorbent in a column in countercurrent. The fluid is generally fed into the lower region and the absorbent into the upper region of the column. Installed in tray columns are sieve trays, bubble-cap trays or valve trays, over which the liquid flows. Columns having random packings can be filled with different shaped bodies. Heat and mass transfer are improved by the increase in the surface area caused by the shaped bodies, which are usually about 25 to 80 mm in size. Known examples are the Raschig ring (a hollow cylinder), Pall ring, Hiflow ring, Intalox saddle and the like. The random packings can be introduced into the column in an ordered manner, or else randomly (as a bed). Possible materials include glass, ceramic, metal and plastics. Structured packings are a further development of ordered random packings. They have a regular structure. As a result, it is possible in the case of structured packings to reduce pressure drops in the gas flow. There are various designs of structured packings, for example woven packings or sheet metal packings. Materials used may be metal, plastic, glass and ceramic.

The temperature of the absorbent in the absorbers is generally about 30 to 100° C., and when a column is used is, for example, 30 to 70° C. at the top of the column and 50 to 100° C. at the bottom of the column.

The $H_2S$-laden absorbent is heated by indirect heat exchange by means of the first heat exchanger with regenerated $H_2S$-selective absorbent from the desorption column, in order to promote the flash-off of $CO_2$ and to minimize the energy requirement in the desorption column. The heated $H_2S$-laden absorbent is decompressed to a pressure of 1.2 to 10 bar in a low-pressure decompression vessel to obtain a first $CO_2$-rich offgas and a partly regenerated absorbent.

In general, the regenerated $H_2S$-selective absorbent coming from the first heat exchanger is brought to a suitable absorption temperature by means of a cooler. For example, the regenerated $H_2S$-selective absorbent is cooled to a temperature of 30 to 60° C.

In the low-pressure decompression vessel, the laden absorbent is decompressed from a higher pressure, as exists, for example, in the first absorber or a high-pressure decompression vessel provided between the absorber and low-pressure decompression vessel, to a lower pressure of 1.2 to 10 bar, for example 1.2 to 3 bar.

Under these conditions, significant portions of the carbon dioxide present in the laden absorbent are released as gas and can be drawn off. The decompression can be accomplished, for example, by means of a throttle valve and/or a decompression turbine.

Preferably, the pressure in the low-pressure decompression vessel is higher than the pressure at which the second absorber is operated, for example 0.1 to 0.5 bar higher. In this way, no compressor is required in order to guide the first $CO_2$-rich offgas into the second absorber.

The low-pressure decompression vessel can be used in the form of a horizontal or upright vessel. Internals used may be liquid intake systems suitable for the decompression process. Examples of these include flash box, flashing feed gallery (in the case of upright vessels) or Schoepentoeter intake systems. To improve the separation of gas and liquid in the vessel, it is possible to use additional internals such as random packings, structured packings, knits or perforated sheets.

In a preferred embodiment, the $H_2S$-laden absorbent is decompressed in a high-pressure decompression vessel to a pressure of 5 to 20 bar, preferably 5 to 15 bar, after leaving the first absorber and before the decompression in the low-pressure decompression vessel. The temperature that exists in the high-pressure decompression vessel is preferably essentially equal to the temperature of the laden absorbent. Under these conditions, essentially all the co-absorbed hydrocarbons and other gases such as nitrogen oxides that are present in the laden absorbent are released in gaseous form and can be discharged from the process or recycled back into the first absorber.

The high-pressure decompression vessel can be used in the form of a horizontal or upright vessel. Internals used may be liquid intake systems suitable for the decompression process. Examples of these include flash box, flashing feed gallery (in the case of upright vessels) or Schoepentoeter intake systems. To improve the separation of gas and liquid in the vessel, it is possible to use additional internals such as random packings, structured packings, knits or perforated sheets.

In a preferred embodiment, the partly regenerated absorbent drawn off from the low-pressure decompression vessel, prior to the regeneration thereof in the desorption column, is heated by indirect exchange by means of a second heat exchanger with regenerated $H_2S$-selective absorbent. A partly cooled regenerated absorbent is obtained, the temperature level of which is sufficient to heat the $H_2S$-laden absorbent by indirect heat exchange. By varying the relative amounts of heat transferred in the first heat exchanger and in the second heat exchanger, it is possible to vary the amount of $CO_2$ flashed off in the low-pressure decompression vessel without increasing the energy requirement in the desorption column.

The partly regenerated absorbent is regenerated in a desorption column. $H_2S$, residual $CO_2$ and any further acidic gas constituents are released from the partly regenerated absorbent as an $H_2S$-rich offgas to obtain a regenerated absorbent. In general, the regeneration comprises at least one of the measures of heating, decompressing and stripping with an inert fluid.

The partly regenerated absorbent is preferably regenerated to a hydrogen sulfide loading corresponding to an equilibrium loading for a hydrogen sulfide content of preferably less than 90%, more preferably less than 50%, of the hydrogen sulfide content of the treated fluid stream. "Equilibrium loading" is understood to mean the hydrogen sulfide content in the absorbent which, under the pressure and temperature conditions at the top of the absorber, is in equilibrium with the specified content of hydrogen sulfide in the treated gas stream that leaves the absorber.

Preferably, the cumulated $CO_2$ and $H_2S$ loading of the regenerated absorbent is less than 0.10 mol/mol, especially less than 0.05 mol/mol. The loading is expressed as the molar amount of $CO_2+H_2S$ dissolved in the absorbent divided by the molar amount of the components of the absorbent which react with $CO_2$ and $H_2S$ (for example aminic components).

The regeneration of the partly regenerated absorbent preferably comprises heating of the partly regenerated absorbent laden with acidic gas constituents. The absorbed acid gases are stripped out by means of the steam obtained by heating the absorbent. If the absorbent used is an aqueous solution of an amine, the stripping gas is usually steam which is raised by partial evaporation of the solution in the bottom of the desorption column or an evaporator connected to the desorption column. The steam can be partly or completely replaced by an inert fluid such as nitrogen. The absolute pressure in the desorption column is normally 0.1 to 3.5 bar, preferably 1.0 to 2.5 bar. The temperature is normally 50° C. to 170° C., preferably 80° C. to 130° C., the temperature of course being dependent on the pressure.

The desorption column may be a column having random packings, having structured packings or having trays. The desorption column has a heater at the bottom, for example a boiler, natural circulation evaporator, forced circulation evaporator or forced circulation flash evaporator. At the top, the desorption column has an outlet for the acid gases released. Entrained absorbent vapors can optionally be condensed in a condenser and recycled into the column.

The $H_2S$-rich offgas obtained in the regeneration is fed to a Claus unit. In the Claus unit, the hydrogen sulfide present in the gas stream, with supply of air, can be converted to elemental sulfur and permanently removed from the environment. A portion of the hydrogen sulfide is combusted with air in the Claus oven to give sulfur dioxide. A further portion of the hydrogen sulfide reacts with the $SO_2$ with comproportionation to give elemental sulfur. The rest of the hydrogen sulfide is reacted catalytically with the remaining $SO_2$ at relatively low temperature to give further elemental sulfur. Still present in the Claus tail gas beyond the last catalytic stage in addition to $N_2$, steam and $CO_2$ are traces of sulfur compounds such as $SO_2$, COS, $CS_2$ and $H_2S$, which have to be removed in order to minimize odor nuisance and damage to the environment. By means of a downstream hydrogenation unit, the sulfur present in the Claus tail gas or the oxygen-containing sulfur compounds and/or the carbon disulfide can be hydrogenated to hydrogen sulfide. A hydrogenated Claus tail gas is obtained.

The hydrogenated Claus tail gas preferably has an $H_2S$ content in the range from 0.5% to 5% by volume, more preferably 0.8% to 4.8% by volume. Higher $H_2S$ contents of the hydrogenated Claus tail gas result in an economically disadvantageous higher circulation rate of the absorbent. The hydrogenated Claus tail gas is suitably cooled before it is guided into the second absorber. This is typically accomplished using a cooler or condenser. Typically, the hydrogenated Claus tail gas is subjected to a water quench. This cools it down to about 30 to 60° C. The cooling of the process gas in the water quench is generally effected by means of circulation water in a closed cooling circuit. The excess water obtained is discharged from the cooling circuit via a level regulation system.

The first $CO_2$-rich offgas is also preferably cooled to a temperature of 30 to 60° C. before it is conducted into the second absorber. This is typically accomplished using a cooler or condenser. Appropriately, the first $CO_2$-rich offgas, and also the hydrogenated Claus tail gas, is subjected to a water quench. Preferably, the water quench of the hydrogenated Claus tail gas and of the first $CO_2$-rich offgas is accomplished using the same apparatus.

The cooled, combined offgases are treated in a second absorber at a pressure of 1 to 4 bar with a second substream of the regenerated $H_2S$-selective absorbent to obtain a second $CO_2$-rich offgas and a second $H_2S$-laden absorbent. The second absorber employed is a scrubbing apparatus used in standard gas scrubbing processes having the preferences mentioned with regard to the first absorber in terms of the embodiments thereof, the second absorber typically having a smaller design than the first absorber.

The second $CO_2$-rich offgas can be guided out of the process and be fed, for example, to an offgas aftertreatment such as a combustion. Since the second $H_2S$-laden absorbent is generally not fully laden and can therefore still absorb $CO_2$ and/or $H_2S$, the second $H_2S$-laden absorbent can also be guided into the first absorber to utilize the residual capacity.

The feed point for the second $H_2S$-laden absorbent into the first absorber is preferably below the metering point for the first substream of the regenerated $H_2S$-selective absorbent. Thus, two absorption zones form in the absorber, with removal of a majority of $CO_2$ and/or $H_2S$ from the fluid stream below the feed point for the second $H_2S$-laden absorbent and aftertreatment of the fluid stream by means of the substream of the regenerated $H_2S$-selective absorbent above the feed point. Thus, the loading capacities of the regenerated $H_2S$-laden absorbent and the second $H_2S$-laden absorbent are utilized optimally and the temperature profile established in the absorber is optimized.

The invention is illustrated in detail by the appended drawings and the examples which follow. FIGS. 1 to 4 use the same reference symbols for elements of the same function. Plant components not required for understanding, such as pumps, are not shown in the figures for the sake of clarity. In general, the person skilled in the art would provide pump internals in lines 3.01, 3.02 and 3.15, and 4.01, 4.02 and 4.18.

Figure 1:
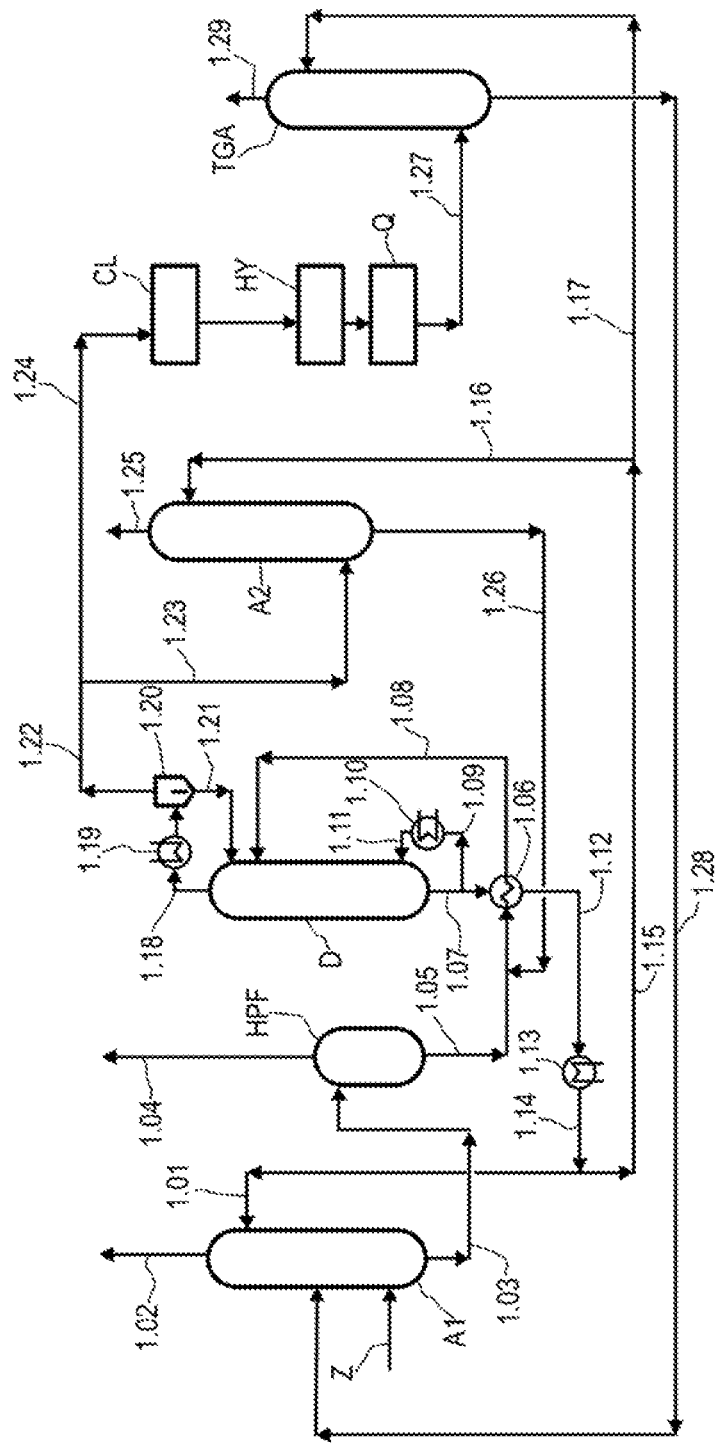
FIG. 1 is a schematic diagram of a plant suitable for treatment of an $H_2S$- and $CO_2$-comprising fluid stream.

According to FIG. 1, via the inlet Z, a suitably pretreated gas comprising hydrogen sulfide and carbon dioxide is contacted in countercurrent, in an absorber A1, with regenerated absorbent fed in in the upper region via the absorbent line 1.01 and the partly laden absorbent fed in in the middle region via the absorbent line 1.28. The absorbent removes hydrogen sulfide and carbon dioxide from the gas by absorption; this affords a hydrogen sulfide- and carbon dioxide-depleted, treated fluid stream via the offgas line 1.02.

Via an absorbent line 1.03, the $CO_2$- and $H_2S$-laden absorbent is passed into a high-pressure decompression vessel HPF and decompressed (for example from about 70 bar to from 5 to 20 bar), the temperature being essentially equal to the temperature of the laden absorbent. Typically, the temperature differential is less than 10° C., preferably less than 5° C. Under these conditions, essentially the hydrocarbons present in the laden absorbent are released as gas and can be discharged via line 1.04.

Via an absorbent line 1.05, a heat exchanger 1.06 in which the $CO_2$- and $H_2S$-laden absorbent is heated up with the heat from the regenerated absorbent conducted through the absorbent line 1.07, and the absorbent line 1.08, the $CO_2$- and $H_2S$-laden absorbent is fed to a desorption column D and regenerated.

From the lower portion of the desorption column D, a substream of the regenerated absorbent conducted via the absorbent line 1.07 is conducted via the absorbent line 1.09 into the oiler 1.10, where it is heated and recycled at least partly as vapor into the desorption column D, in the present case via the absorbent line 1.11.

A further substream of the regenerated absorbent conducted via the absorbent line 1.07 is conducted onward via the heat exchanger 1.06, in which the regenerated absorbent heats up the $CO_2$- and $H_2S$-laden absorbent and is itself cooled down in the process, the absorbent line 1.12, the cooler 1.13 and the absorbent line 1.14, and divided into the substreams 1.01 and 1.15.

The substream 1.01 is fed to the absorber A1. The substream 1.15 is in turn divided into substreams 1.16 and 1.17.

The $CO_2$- and $H_2S$-containing gas released in the desorption column D leaves the desorption column D via the offgas line 1.18. It is conducted via a cooler 1.19 into a condenser with integrated phase separation 1.20, where it is separated from entrained absorbent vapor. Subsequently, a liquid consisting mainly of water is conducted through the absorbent line 1.21 into the upper region of the desorption column D, and a $CO_2$- and $H_2S$-containing gas is conducted onward via the gas line 1.22. The gas stream 1.22 is divided into substreams 1.23 and 1.24.

The substream 1.23 is conducted into an absorber A2 and contacted in countercurrent therein with regenerated absorbent which is supplied via the absorbent line 1.16. The absorbent removes hydrogen sulfide from the gas by absorption; this affords essentially pure carbon dioxide via the offgas line 1.25. Via the absorbent line 1.26, an $H_2S$-laden absorbent is guided into the absorbent line 1.05 and fed via the heat exchanger 1.06 and the absorbent line 1.08 to the desorption column D and regenerated.

The $CO_2$- and $H_2S$-containing gas stream 1.24 is fed to a Claus plant CL, the offgas from which comprises mainly $N_2$, $CO_2$, $SO_2$, COS, $CS_2$, $H_2S$, $H_2O$ and sulfur. The offgas is hydrogenated in the hydrogenation plant HY. The hydrogenated Claus tail gas comprising essentially $H_2$, $N_2$, $CO_2$, $H_2O$ and $H_2S$ is conducted through a quench cooler Q and cooled. The quench fluid in the quench cooler Q is essentially water.

The cooled hydrogenated Claus tail gas is fed via the gas line 1.27 into the tail gas absorber TGA, where it is contacted in countercurrent with the regenerated absorbent fed in via the absorbent line 1.17. Via the absorbent line 1.28, a partly $H_2S$-laden absorbent from the tail gas absorber TGA is fed into the middle section of the absorber A1. Via a gas line 1.29, the $H_2S$-depleted gas is removed from the tail gas absorber TGA and discharged from the process.

Figure 2:
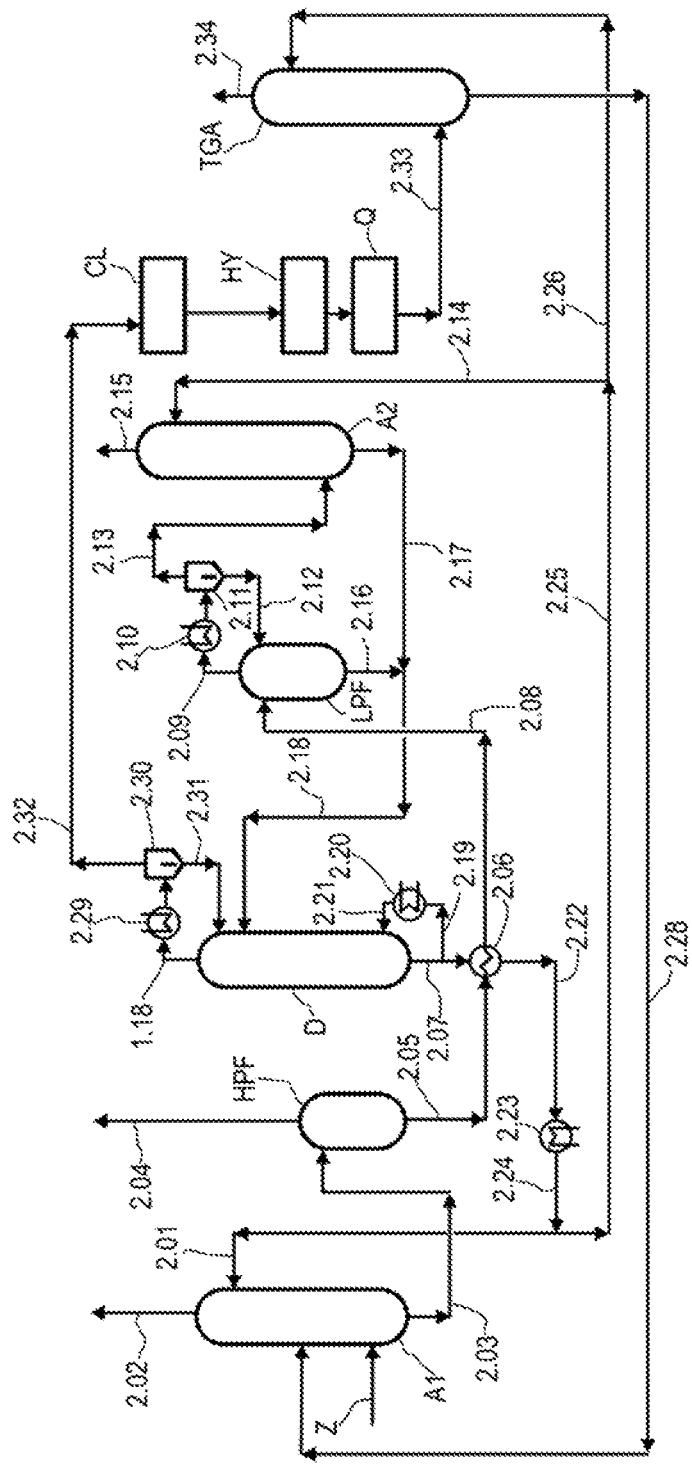
FIG. 2 is a schematic diagram of a further plant suitable for treatment of an $H_2S$- and $CO_2$-comprising fluid stream.

According to FIG. 2, via the inlet Z, a suitably pretreated gas comprising hydrogen sulfide and carbon dioxide is contacted in countercurrent, in an absorber A1, with regenerated absorbent fed in in the upper region via the absorbent line 2.01 and the partly laden absorbent fed in in the middle region via the absorbent line 2.28. The absorbent removes hydrogen sulfide and carbon dioxide from the gas by absorption; this affords a hydrogen sulfide- and carbon dioxide-depleted, treated fluid stream via the offgas line 2.02.

Via an absorbent line 2.03, the $CO_2$- and $H_2S$-laden absorbent is passed into a high-pressure decompression vessel HPF and decompressed (for example from about 70 bar to from 5 to 20 bar), the temperature being essentially equal to the temperature of the laden absorbent. Typically, the temperature differential is less than 10° C., for example less than 5° C. Under these conditions, essentially all the hydrocarbons present in the laden absorbent are released as gas and can be discharged via line 2.04.

Via an absorbent line 2.05, a heat exchanger 2.06 in which the $CO_2$- and $H_2S$-laden absorbent is heated up with the heat from the regenerated absorbent conducted through the absorbent line 2.07, and the absorbent line 2.08, the $CO_2$- and $H_2S$-laden absorbent is guided into a low-pressure decompression vessel LPF and decompressed (for example to a pressure of 1.2 to 10 bar, for example 1.2 to 3 bar). Under these conditions, significant portions of the carbon dioxide present in the laden absorbent are released as gas and can be conducted onward via the gas line 2.09 to obtain a partly regenerated absorbent.

The $CO_2$ gas is conducted via a cooler 2.10 into a condenser with integrated phase separation 2.11, where it is separated from entrained absorbent vapor. Subsequently, a liquid consisting mainly of water is conducted via the absorbent line 2.12 into the upper region of the low-pressure decompression vessel LPF. The $CO_2$ gas comprises considerable amounts of $H_2S$, which has to be removed before the $CO_2$ can be discharged. For this purpose, the gas is fed via the gas line 2.13 into the absorber A2, where it is contacted in countercurrent with the regenerated absorbent fed in via the absorbent line 2.14. The absorbent removes hydrogen sulfide by absorption from the gas; this affords essentially pure carbon dioxide which is conducted out of the plant via a gas line 2.15.

The partly regenerated absorbent discharged via the absorbent line 2.16 from the lower region of the low-pressure decompression vessel LPF and the $H_2S$-laden absorbent discharged via the absorbent line 2.17 from the lower region of the absorber A2 are fed via the absorbent lines 2.18 into the upper region of the desorption column D and regenerated.

From the lower portion of the desorption column D, a substream of the regenerated absorbent conducted via the absorbent line 2.07 is conducted via the absorbent line 2.19 into the boiler 2.20, where it is heated and recycled at least partly as vapor into the desorption column D, in the present case via the absorbent line 2.21.

A further substream of the regenerated absorbent conducted via the absorbent line 2.07 is conducted onward via the heat exchanger 2.06, in which the regenerated absorbent heats up the $CO_2$- and $H_2S$-laden absorbent and is itself cooled down in the process, the absorbent line 2.22, the cooler 2.23 and the absorbent line 2.24, and divided into the substreams 2.01 and 2.25. The substream 2.01 is fed to the absorber A1. The substream 2.25 is in turn divided into the substreams 2.14 and 2.26.

The $CO_2$- and $H_2S$-containing gas released in the desorption column D leaves the desorption column D via the offgas line 2.27. It is conducted via a cooler 2.29 into a condenser with integrated phase separation 2.30, where it is separated from entrained absorbent vapor. Subsequently, a liquid consisting mainly of water is conducted through the absorbent line 2.31 into the upper region of the desorption column D, and a $CO_2$- and $H_2S$-containing gas is conducted onward via the gas line 2.32.

The $CO_2$- and $H_2S$-containing gas stream 2.32 is fed to a Claus plant CL, the offgas from which comprises mainly $N_2$, $CO_2$, $SO_2$, COS, $CS_2$, $H_2S$, $H_2O$ and sulfur. The offgas is hydrogenated in the hydrogenation plant HY. The hydrogenated Claus tail gas comprising essentially $H_2$, $N_2$, $CO_2$, $H_2O$ and $H_2S$ is conducted through a quench cooler Q and cooled. The quench fluid in the quench cooler Q is essentially water.

The cooled hydrogenated Claus tail gas is fed via the gas line 2.33 into the tail gas absorber TGA, where it is contacted in countercurrent with the regenerated absorbent fed in via the absorbent line 2.26. Via the absorbent line 2.28, a partly $H_2S$-laden absorbent from the tail gas absorber TGA is fed into the middle section of the absorber A1. Via a gas line 2.34, the $H_2S$-depleted gas is removed from the tail gas absorber TGA and discharged from the process.

Figure 3:
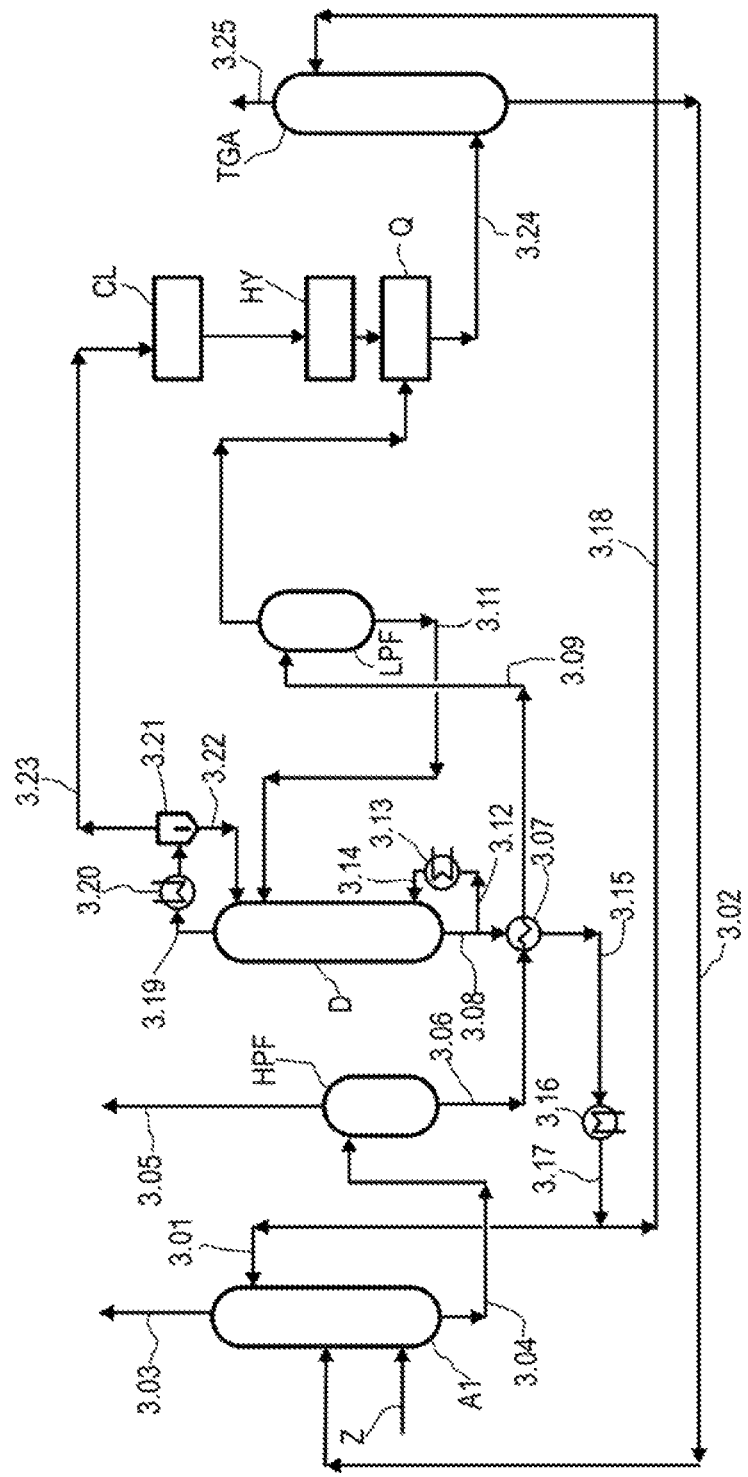
FIG. 3 is a schematic diagram of a plant suitable for performing the process of the invention.

According to FIG. 3, via the inlet Z, a suitably pretreated gas comprising hydrogen sulfide and carbon dioxide is contacted in countercurrent, in an absorber A1, with regenerated absorbent fed in in the upper region via the absorbent line 3.01 and the partly laden absorbent fed in in the middle region via the absorbent line 3.02. The absorbent removes hydrogen sulfide and carbon dioxide from the gas by absorption; this affords a hydrogen sulfide- and carbon dioxide-depleted, treated fluid stream via the offgas line 3.03.

Via an absorbent line 3.04, the $CO_2$- and $H_2S$-laden absorbent is passed into a high-pressure decompression vessel HPF and decompressed (for example from about 70 bar to from 5 to 20 bar), the temperature being essentially equal to the temperature of the laden absorbent. Typically, the temperature differential is less than 10° C., preferably less than 5° C. Under these conditions, essentially the hydrocarbons present in the laden absorbent are released as gas and can be discharged via line 3.05.

Via an absorbent line 3.06, a heat exchanger 3.07 in which the $CO_2$- and $H_2S$-laden absorbent is heated up with the heat from the regenerated absorbent conducted through the absorbent line 3.08, and the absorbent line 3.09, the $CO_2$- and $H_2S$-laden absorbent is guided into a low-pressure decompression vessel LPF and decompressed to a pressure of 1.2 to 10 bar, preferably 1.2 to 3 bar. Under these conditions, significant portions of the carbon dioxide present in the laden absorbent are released as gas and can be conducted onward as the first $CO_2$-rich offgas via the gas line 3.10 to obtain a partly regenerated absorbent.

The partly regenerated absorbent discharged via the absorbent line 3.11 from the lower region of the low-pressure decompression vessel LPF is fed into the upper region of the desorption column D and regenerated. From the lower portion of the desorption column D, a substream of the regenerated absorbent conducted via the absorbent line 3.08 is conducted via the absorbent line 3.12 into the boiler 3.13, where it is heated and recycled at least partly as vapor into the desorption column D, in the present case via the absorbent line 3.14.

Instead of the boiler shown, it is also possible to use other heat exchanger types to raise the stripping vapor, such as a natural circulation evaporator, forced circulation evaporator or forced circulation flash evaporator. In the case of these evaporator types, a mixed-phase stream of regenerated absorbent and stripping vapor is returned to the bottom of the desorption column, where the phase separation between the vapor and the absorbent takes place.

A further substream of the regenerated absorbent conducted via the absorbent line 3.08 is conducted onward via the heat exchanger 3.07, in which the regenerated absorbent heats up the $CO_2$- and $H_2S$-laden absorbent and is itself cooled down in the process, the absorbent line 3.15, the cooler 3.16 and the absorbent line 3.17, and divided into the substreams 3.01 and 3.18. The substream 3.01 is fed to the upper region of the absorber A1. The substream 3.18 is fed into the upper region of a tail gas absorber TGA.

The $H_2S$-rich offgas released in the desorption column D leaves the desorption column D via the offgas line 3.19. It is conducted via a cooler 3.20 into a condenser with integrated phase separation 3.21, where it is separated from entrained absorbent vapor. In this and all the other plants suitable for performance of the process of the invention, condensation and phase separation may also be present separately from one another. Subsequently, a liquid consisting mainly of water is conducted through the absorbent line 3.22 into the upper region of the desorption column D, and the $H_2S$-rich offgas is conducted onward via the gas line 3.23.

The $H_2S$-rich offgas is fed via the gas line 3.23 to a Claus plant CL, the offgas from which comprises mainly $N_2$, $CO_2$, $SO_2$, COS, $CS_2$, $H_2S$, $H_2O$ and sulfur. The offgas is hydrogenated in the hydrogenation plant HY to obtain hydrogenated Claus tail gas. The hydrogenated Claus tail gas comprising essentially $H_2$, $N_2$, $CO_2$, $H_2O$ and $H_2S$, just like the first $CO_2$-rich offgas of gas line 3.10, is conducted through a quench cooler Q and cooled. The quench fluid in the quench cooler Q is essentially water.

The hydrogenated Claus tail gas and the first $CO_2$-rich offgas are combined and fed via the gas line 3.24 into the tail gas absorber TGA, where the gas is contacted in countercurrent with the regenerated absorbent fed in via the absorbent line 3.18. Via the absorbent line 3.02, a second $H_2S$-laden absorbent from the tail gas absorber TGA is fed into the middle section of the absorber A1. The remaining absorption capacity of the second $H_2S$-laden absorbent from the tail gas absorber TGA can thus be utilized. Via a gas line 3.25, a second $CO_2$-rich offgas is removed from the tail gas absorber TGA and discharged from the process.

Figure 4:
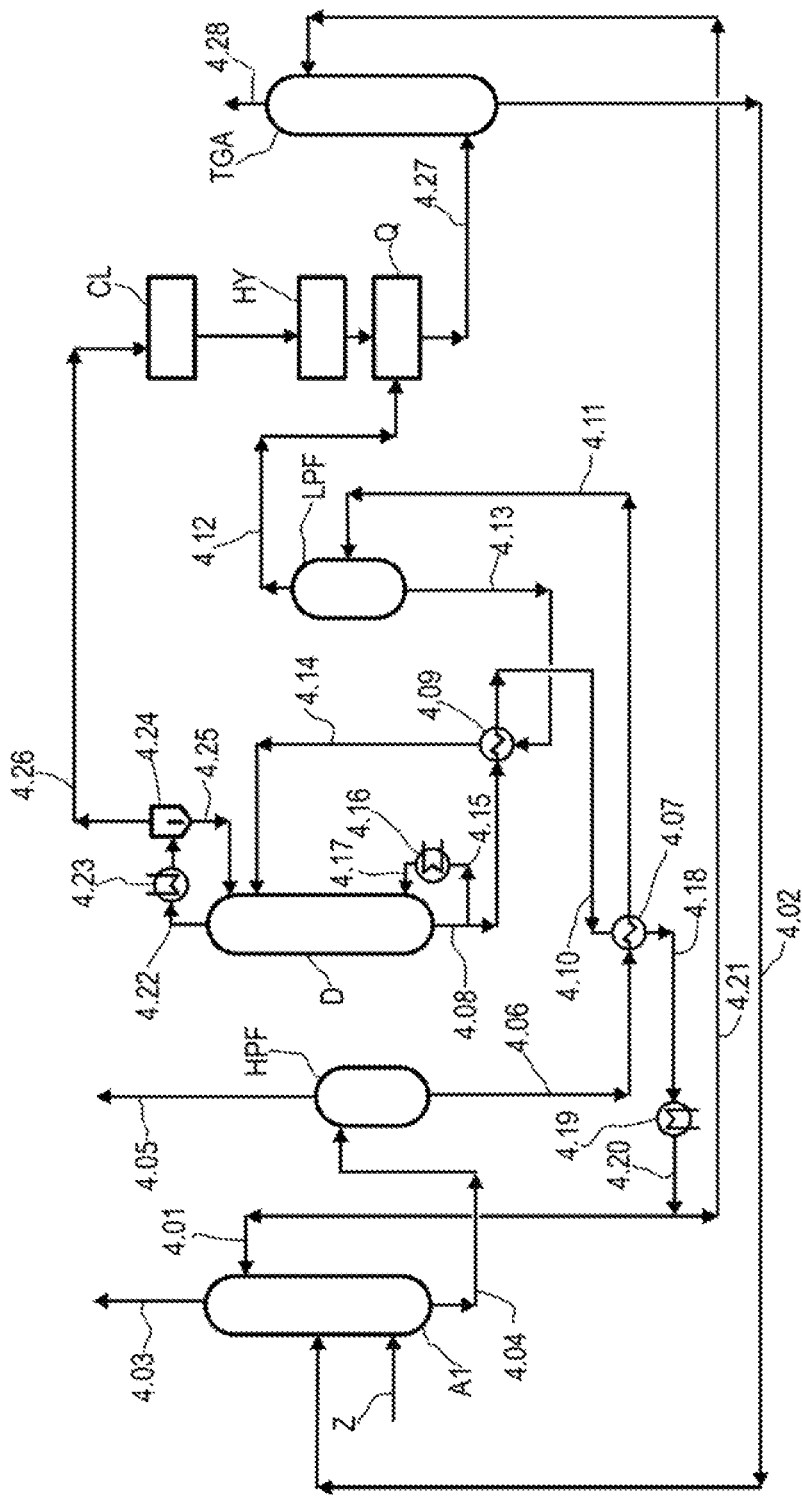
FIG. 4 is a schematic diagram of a further plant suitable for performing the process of the invention.

According to FIG. 4, via the inlet Z, a suitably pretreated gas comprising hydrogen sulfide and carbon dioxide is contacted in countercurrent, in an absorber A1, with regenerated absorbent fed in in the upper region via the absorbent line 4.01 and the partly laden absorbent fed in in the middle region via the absorbent line 4.02. The absorbent removes hydrogen sulfide and carbon dioxide from the gas by absorption; this affords a hydrogen sulfide- and carbon dioxide-depleted, treated fluid stream via the offgas line 4.03.

Via an absorbent line 4.04, the $CO_2$- and $H_2S$-laden absorbent is passed into a high-pressure decompression vessel HPF and decompressed (for example from about 70 bar to from 5 to 20 bar), the temperature being essentially equal to the temperature of the laden absorbent. Typically, the temperature differential is less than 10° C., preferably less than 5° C. Under these conditions, essentially all the hydrocarbons present in the laden absorbent are released as gas and can be discharged via line 4.05.

Via an absorbent line 4.06, a heat exchanger 4.07 in which the $CO_2$- and $H_2S$-laden absorbent is heated up with the heat from the regenerated absorbent conducted through the absorbent line 4.08, the heat exchanger 4.09 and the absorbent line 4.10, and the absorbent line 4.11, the $CO_2$- and $H_2S$-laden absorbent is guided into a low-pressure decompression vessel LPF and decompressed to a pressure of 1.2 to 10 bar, preferably 1.2 to 3 bar. Under these conditions, significant portions of the carbon dioxide present in the laden absorbent are released as gas and can be conducted onward as the first $CO_2$-rich offgas via the gas line 4.12 to obtain a partly regenerated absorbent.

The partly regenerated absorbent discharged via the absorbent line 4.13 from the lower region of the low-pressure decompression vessel LPF is fed via the heat exchanger 4.09, in which the partly regenerated absorbent is heated up with the heat from the regenerated absorbent conducted through the absorbent line 4.08, and the absorbent line 4.14, into the upper region of a desorption column D and regenerated. From the lower portion of the desorption column D, a substream of the regenerated absorbent conducted via the absorbent line 4.08 is conducted via the absorbent line 4.15 into the boiler 4.16, where it is heated and recycled at least partly as vapor into the desorption column D, in the present case via the absorbent line 4.17.

Instead of the boiler shown, it is also possible to use other heat exchanger types to raise the stripping vapor, such as a natural circulation evaporator, forced circulation evaporator or forced circulation flash evaporator. In the case of these evaporator types, a mixed-phase stream of regenerated absorbent and stripping vapor is returned to the bottom of the desorption column, where the phase separation between the vapor and the absorbent takes place.

A further substream of the regenerated absorbent conducted via the absorbent line 4.08 is conducted onward via the heat exchanger 4.09, in which the regenerated absorbent heats up the partly regenerated absorbent and is itself cooled down in the process, the absorbent line 4.10 in which the regenerated absorbent heats up the $CO_2$- and $H_2S$-laden absorbent and is itself cooled down in the process, the absorbent line 4.18, the cooler 4.19 and the absorbent line 4.20, and divided into the substreams 4.01 and 4.21. The substream 4.01 is fed to the upper region of the absorber A1. The substream 4.21 is fed into the upper region of a tail gas absorber TGA.

The $H_2S$-rich offgas released in the desorption column D leaves the desorption column D via the offgas line 4.22. It is conducted via a cooler 4.23 into a condenser with integrated phase separation 4.24, where it is separated from entrained absorbent vapor. In this and all the other plants suitable for performance of the process of the invention, condensation and phase separation may also be present separately from one another. Subsequently, a liquid consisting mainly of water is conducted through the absorbent line 4.25 into the upper region of the desorption column D, and the $H_2S$-rich offgas is conducted onward via the gas line 4.26.

The $H_2S$-rich offgas is fed via the gas line 4.26 to a Claus plant CL, the offgas from which comprises mainly $N_2$, $CO_2$, $SO_2$, COS, $CS_2$, $H_2S$, $H_2O$ and sulfur. The offgas is hydrogenated in the hydrogenation plant HY to obtain hydrogenated Claus tail gas. The hydrogenated Claus tail gas comprising essentially $H_2$, $N_2$, $CO_2$, $H_2O$ and $H_2S$, just like the first $CO_2$-rich offgas of gas line 4.12, is conducted through a quench cooler Q and cooled. The quench fluid in the quench cooler Q is essentially water.

The hydrogenated Claus tail gas and the first $CO_2$-rich offgas are combined and fed via the gas line 4.27 into the tail gas absorber TGA, where the gas is contacted in countercurrent with the regenerated absorbent fed in via the absorbent line 4.21. Via the absorbent line 4.02, a second $H_2S$-laden absorbent from the tail gas absorber TGA is fed into the middle section of the absorber A1. The remaining absorption capacity of the second $H_2S$-laden absorbent from the tail gas absorber TGA can thus be utilized. Via a gas line 4.28, a second $CO_2$-rich offgas is removed from the tail gas absorber TGA and discharged from the process.

EXAMPLES

A simulation model was used for the performance of the examples. The phase equilibria were described using a model by Pitzer (K. S. Pitzer, Activity Coefficients in Electrolyte Solutions 2nd ed., CRC Press, 1991, Chapter 3, Ion Interaction Approach: Theory). The model parameters were fitted to gas solubility measurements of carbon dioxide, hydrogen sulfide and hydrocarbons in aqueous MDEA solutions. The reaction kinetics of $CO_2$ with MDEA were determined by experiments in a twin stirred cell and incorporated into the simulation model.

For all examples, an aqueous absorbent comprising 45% by weight of MDEA and 0.5% by weight of phosphoric acid was assumed. The composition of the fluid stream to be treated was fixed as 10.06% by volume of $CO_2$, 2.01% by volume of $H_2S$, 82.90% by volume of methane and 5.03% by volume of ethane (323 786 m$^3$ (STP)/h, 40.0° C., 61.0 bar). This composition is based on the fluid stream excluding the water content (1876 m$^3$ (STP)/h), i.e. the "dry fluid stream". The separation task was to lower the $H_2S$ content to less than 5 ppm by volume and the $CO_2$ content to less than 2.3% by volume. In addition, the $H_2S$ content of the treated gases which are discharged from the absorbers connected downstream of the first absorber was to be less than 100 ppm by volume in each case.

In the absorber A1, the internals used were random packings (IMTP40). The packing height in the absorber A1 was 16 m; the design of the column diameter was based on 80% of the flood limit.

In the absorber A2, the internals used were random packings (IMTP40). The packing height in the absorber A2 was 6 m; the design of the column diameter was based on 80% of the flood limit.

In the absorber TGA, the internals used were random packings (IMTP40). The packing height in the absorber TGA was 6 m; the design of the column diameter was based on 80% of the flood limit.

In the desorption column D, the internals used were Pall rings (size: 50 mm). The packing height of the desorption column was 10 m; the design of the column diameter was based on 65% of the flood limit.

Example 1 (Comparative Example)

By means of the simulation model, a process for treatment of an $H_2S$- and $CO_2$-comprising fluid stream using the above-described absorbent was examined. The pilot plant corresponded to FIG. 1. The following table states the compositions of various dry fluid streams:

| # | V [m$^3$ (STP)/h] | T [° C.] | p [bar] | $CO_2$ [% by vol.] | $H_2S$ [% by vol.] | $CH_4$ [% by vol.] | $C_2H_6$ [% by vol.] | $N_2$ [% by vol.] | $H_2$ [% by vol.] |
|---|---|---|---|---|---|---|---|---|---|
| Z | 323 786 | 40.0 | 61.0 | 10.06 | 2.01 | 82.90 | 5.03 | 0.00 | 0.00 |
| 1.02 | 290 474 | 45.9 | 60.9 | 2.21 | 0.0* | 92.20 | 5.59 | 0.00 | 0.00 |
| 1.04 | 804 | 69.0 | 8.0 | 24.36 | 2.70 | 68.87 | 4.07 | 0.00 | 0.00 |
| 1.18 | 42 128 | 98.1 | 2.1 | 69.84 | 30.02 | 0.14 | 0.01 | 0.00 | 0.00 |
| 1.23 | 19 440 | 45.0 | 2.0 | 69.86 | 30.00 | 0.14 | 0.01 | 0.00 | 0.00 |
| 1.24 | 22 630 | 45.0 | 2.0 | 69.86 | 30.00 | 0.14 | 0.01 | 0.00 | 0.00 |
| 1.25 | 11 379 | 45.7 | 1.8 | 99.74 | 0.01 | 0.23 | 0.02 | 0.00 | 0.00 |
| 1.27 | 29 313 | 40.0 | 1.4 | 54.04 | 0.93 | 0.00 | 0.00 | 42.98 | 45.24 |
| 1.29 | 27 844 | 45.6 | 1.3 | 52.58 | 0.01 | 0.00 | 0.00 | 45.24 | 2.16 |

*3 ppm by vol.

Example 2 (Comparative Example)

By means of the simulation model, a process for treatment of an $H_2S$- and $CO_2$-comprising fluid stream using the above-described absorbent was examined. The pilot plant corresponded to FIG. 2. The following table states the compositions of various dry fluid streams:

| # | V [m$^3$ (STP)/h] | T [° C.] | p [bar] | $CO_2$ [% by vol.] | $H_2S$ [% by vol.] | $CH_4$ [% by vol.] | $C_2H_6$ [% by vol.] | $N_2$ [% by vol.] | $H_2$ [% by vol.] |
|---|---|---|---|---|---|---|---|---|---|
| Z | 323 786 | 40.0 | 61.0 | 10.06 | 2.01 | 82.90 | 5.03 | 0.00 | 0.00 |
| 2.02 | 290 482 | 45.8 | 60.9 | 2.21 | 0.00* | 92.20 | 5.59 | 0.00 | 0.00 |
| 2.04 | 795 | 69.0 | 8.0 | 24.47 | 2.74 | 68.74 | 4.06 | 0.00 | 0.00 |
| 2.09 | 19 967 | 97.2 | 2.5 | 87.91 | 11.79 | 0.28 | 0.02 | 0.00 | 0.00 |
| 2.13 | 19 947 | 40.0 | 2.4 | 87.92 | 11.78 | 0.28 | 0.02 | 0.00 | 0.00 |
| 2.15 | 15 177 | 46.1 | 2.3 | 98.80 | 0.01 | 0.37 | 0.03 | 0.00 | 0.00 |
| 2.27 | 18 472 | 93.7 | 2.1 | 63.27 | 36.73 | 0.00 | 0.00 | 0.00 | 0.00 |
| 2.32 | 18 453 | 45.0 | 2.0 | 63.28 | 36.72 | 0.00 | 0.00 | 0.00 | 0.00 |
| 2.33 | 24 766 | 40.0 | 1.4 | 47.14 | 1.09 | 0.00 | 0.00 | 49.71 | 2.05 |
| 2.34 | 23 663 | 45.6 | 1.3 | 45.82 | 0.01 | 0.00 | 0.00 | 52.02 | 2.15 |

*2 ppm by vol.

Example 3

By means of the simulation model, a process for treatment of an $H_2S$- and $CO_2$-comprising fluid stream using the above-described absorbent was examined. The pilot plant corresponded to FIG. 3. The following table states the compositions of various dry fluid streams:

| # | V [m³ (STP)/h] | T [° C.] | p [bar] | $CO_2$ [% by vol.] | $H_2S$ [% by vol.] | $CH_4$ [% by vol.] | $C_2H_6$ [% by vol.] | $N_2$ [% by vol.] | $H_2$ [% by vol.] |
|---|---|---|---|---|---|---|---|---|---|
| Z | 323 786 | 40.0 | 61.0 | 10.06 | 2.01 | 82.90 | 5.03 | 0.00 | 0.00 |
| 3.03 | 290 452 | 46.3 | 60.9 | 2.21 | 0.00* | 92.20 | 5.59 | 0.00 | 0.00 |
| 3.05 | 870 | 69.7 | 8.0 | 26.07 | 4.05 | 66.03 | 3.85 | 0.00 | 0.00 |
| 3.10 | 22 233 | 95.6 | 2.5 | 83.73 | 15.99 | 0.26 | 0.02 | 0.00 | 0.00 |
| 3.19 | 16 880 | 96.6 | 2.1 | 59.79 | 40.21 | 0.00 | 0.00 | 0.00 | 0.00 |
| 3.23 | 16 857 | 45.0 | 2.0 | 59.82 | 40.18 | 0.00 | 0.00 | 0.00 | 0.00 |
| 3.24 | 45 361 | 40.0 | 1.4 | 63.25 | 8.43 | 0.13 | 0.01 | 27.14 | 1.05 |
| 3.25 | 38 772 | 45.4 | 1.3 | 66.86 | 0.01 | 0.15 | 0.01 | 31.74 | 1.22 |

*4 ppm by vol.

Example 4

By means of the simulation model, a process for treatment of an $H_2S$- and $CO_2$-comprising fluid stream using the above-described absorbent was examined. The pilot plant corresponded to FIG. 4. The following table states the compositions of various dry fluid streams:

| # | V [m³ (STP)/h] | T [° C.] | p [bar] | $CO_2$ [% by vol.] | $H_2S$ [% by vol.] | $CH_4$ [% by vol.] | $C_2H_6$ [% by vol.] | $N_2$ [% by vol.] | $H_2$ [% by vol.] |
|---|---|---|---|---|---|---|---|---|---|
| Z | 323 786 | 40.0 | 61.0 | 10.06 | 2.01 | 82.90 | 5.03 | 0.00 | 0.00 |
| 4.03 | 290 452 | 46.2 | 60.9 | 2.21 | 0.00* | 92.20 | 5.59 | 0.00 | 0.00 |
| 4.05 | 849 | 69.3 | 8.0 | 25.24 | 3.29 | 67.50 | 3.96 | 0.00 | 0.00 |
| 4.12 | 14 484 | 86.1 | 2.5 | 87.65 | 11.91 | 0.41 | 0.03 | 0.00 | 0.00 |
| 4.22 | 22 625 | 97.0 | 2.1 | 69.98 | 30.02 | 0.00 | 0.00 | 0.00 | 0.00 |
| 4.26 | 22 596 | 45.0 | 2.0 | 70.00 | 30.00 | 0.00 | 0.00 | 0.00 | 0.00 |
| 4.27 | 43 480 | 40.0 | 1.4 | 65.56 | 4.59 | 0.14 | 0.01 | 28.33 | 1.37 |
| 4.28 | 38 915 | 45.5 | 1.3 | 66.65 | 0.01 | 0.15 | 0.01 | 31.65 | 1.53 |

*3 ppm by vol.

For the examples, the relative regeneration energy was determined on the basis of the power of the boiler of the desorption column and the relative total circulation rate of the scrubbing agent. The total circulation rate of the scrubbing agent is understood to mean the respective mass flow of streams 1.12, 2.22, 3.15 and 4.15.

| Example | Relative regeneration energy** | Relative total circulation rate Absorbent** |
|---|---|---|
| 1* | 100% | 100% |
| 2* | 101% | 92.3% |
| 3 | 87.5% | 85.6% |
| 4 | 83.2% | 83.4% |

*comparative example
**relative to example 1

It is clear that the processes of examples 3 and 4 require a lower regeneration energy and a lower total circulation rate of the absorbent than the processes of examples 1 and 2.

The invention claimed is:

1. A process for treating an $H_2S$- and $CO_2$-comprising hydrocarbonaceous fluid stream, in which
   a) the fluid stream is treated in a first absorber at a pressure of 10 to 150 bar with a first substream of a regenerated $H_2S$-selective absorbent to obtain a treated fluid stream and $H_2S$-laden absorbent;
   b) the $H_2S$-laden absorbent is heated by indirect heat exchange with regenerated $H_2S$-selective absorbent;
   c) the heated $H_2S$-laden absorbent is decompressed to a pressure of 1.2 to 10 bar in a low-pressure decompression vessel to obtain a first $CO_2$-rich offgas and a partly regenerated absorbent;
   d) the partly regenerated absorbent is regenerated in a desorption column to obtain an $H_2S$-rich offgas and regenerated absorbent;
   e) the $H_2S$-rich offgas is fed to a Claus unit and the offgas from the Claus unit is fed to a hydrogenation unit to obtain hydrogenated Claus tail gas;
   f) the hydrogenated Claus tail gas and the first $CO_2$-rich ragas are treated in a second absorber at a pressure of 1 to 4 bar with a second substream of the regenerated $H_2S$-selective absorbent to obtain a second $CO_2$-rich offgas and a second $H_2S$-laden absorbent; and
   g) the second $H_2S$-laden absorbent is guided into the first absorber.

2. The process according to claim 1, wherein the $H_2S$-laden absorbent is decompressed in a high-pressure decompression vessel to a pressure of 5 to 20 bar after leaving the first absorber and before the decompression in the low-pressure decompression vessel.

3. The process according to claim 1, wherein the partly regenerated absorbent is heated by indirect heat exchange with regenerated $H_2S$-selective absorbent and a partly cooled regenerated absorbent is obtained and the partly cooled regenerated absorbent is used to heat the $H_2S$-laden absorbent by indirect heat exchange.

4. The process according to claim 1, wherein the first $CO_2$-rich tags and the hydrogenated Claus tail gas are cooled individually or in combination before the treatment in the second absorber.

5. The process according to claim 1, wherein the second $H_2S$-laden absorbent is guided into the first absorber below the feed point for the first substream of the regenerated $H_2S$-selective absorbent.

6. The process according to claim 1, in which the $H_2S$-selective absorbent comprises an aqueous solution of at least one amine selected from the group consisting of tertiary amines and sterically hindered amines.

7. The process according to claim 6, in which the $H_2S$-selective absorbent comprises an aqueous solution of methyldiethanolamine.

8. The process according to claim 6, wherein the absorbent comprises an acid.

9. The process according to claim 1, wherein there is a partial $H_2S$ pressure of at least 0.1 bar and a partial $CO_2$ pressure of at least 0.2 bar in the fluid stream.

10. The process according to claim 1, wherein the hydrogenated Claus tail gas comprises 0.5% to 5% by volume of $H_2S$.

11. A plant for conducting the process of claim 1, comprising
 a) a first absorber connected via a first heat exchanger in a fluid-conducting manner to a desorption column, in order to accept a first substream of a regenerated $H_2S$-selective absorbent from the desorption column, the first absorber being designed to promote the absorption of $H_2S$ and $CO_2$ from the fluid stream into the first substream of the regenerated $H_2S$-selective absorbent at a pressure of 10 to 150 bar to obtain a treated fluid stream and an $H_2S$-laden absorbent; and the first heat exchanger being designed to heat the $H_2S$-laden absorbent by indirect heat exchange with regenerated $H_2S$-selective absorbent from the desorption column;
 b) a low-pressure decompression vessel which is connected in a fluid-conducting manner to the first heat exchanger and is designed to decompress the heated $H_2S$-laden absorbent at a pressure of 1.2 to 10 bar to obtain a first $CO_2$-rich offgas and a partly regenerated absorbent;
 c) a line which guides the partly regenerated absorbent into the desorption column to obtain an $H_2S$-rich offgas and regenerated absorbent;
 d) a Claus unit which accepts the $H_2S$-rich offgas, and a hydrogenation unit which accepts the offgas from the Claus unit to obtain hydrogenated Claus tail gas;
 e) a second absorber which is connected in a fluid-conducting manner to the desorption column and is designed to promote the absorption of $H_2S$ from the hydrogenated Claus tail gas and the first $CO_2$-rich offgas into a second substream of the regenerated $H_2S$-selective absorbent at a pressure of 1 to 4 bar to obtain a second $CO_2$-rich offgas and a second $H_2S$-laden absorbent; and
 f) a line which guides the second $H_2S$-laden absorbent into the first absorber.

12. The plant according to claim 11, further comprising a high-pressure decompression vessel which is designed to decompress the $H_2S$-laden absorbent from the first absorber.

13. The plant according to claim 11, further comprising a cooler designed to cool the regenerated $H_2S$-selective absorbent coming from the first heat exchanger.

14. The plant according to claim 11, wherein the low-pressure decompression vessel is connected via a second heat exchanger in a fluid-conducting manner to the desorption column, and the second heat exchanger is designed to beat the partly regenerated absorbent by indirect heat exchange with the regenerated $H_2S$-selective absorbent.

* * * * *